March 7, 1950     B. F. GREGORY     2,499,495
VEHICLE CHASSIS
Filed Dec. 8, 1945     3 Sheets-Sheet 1
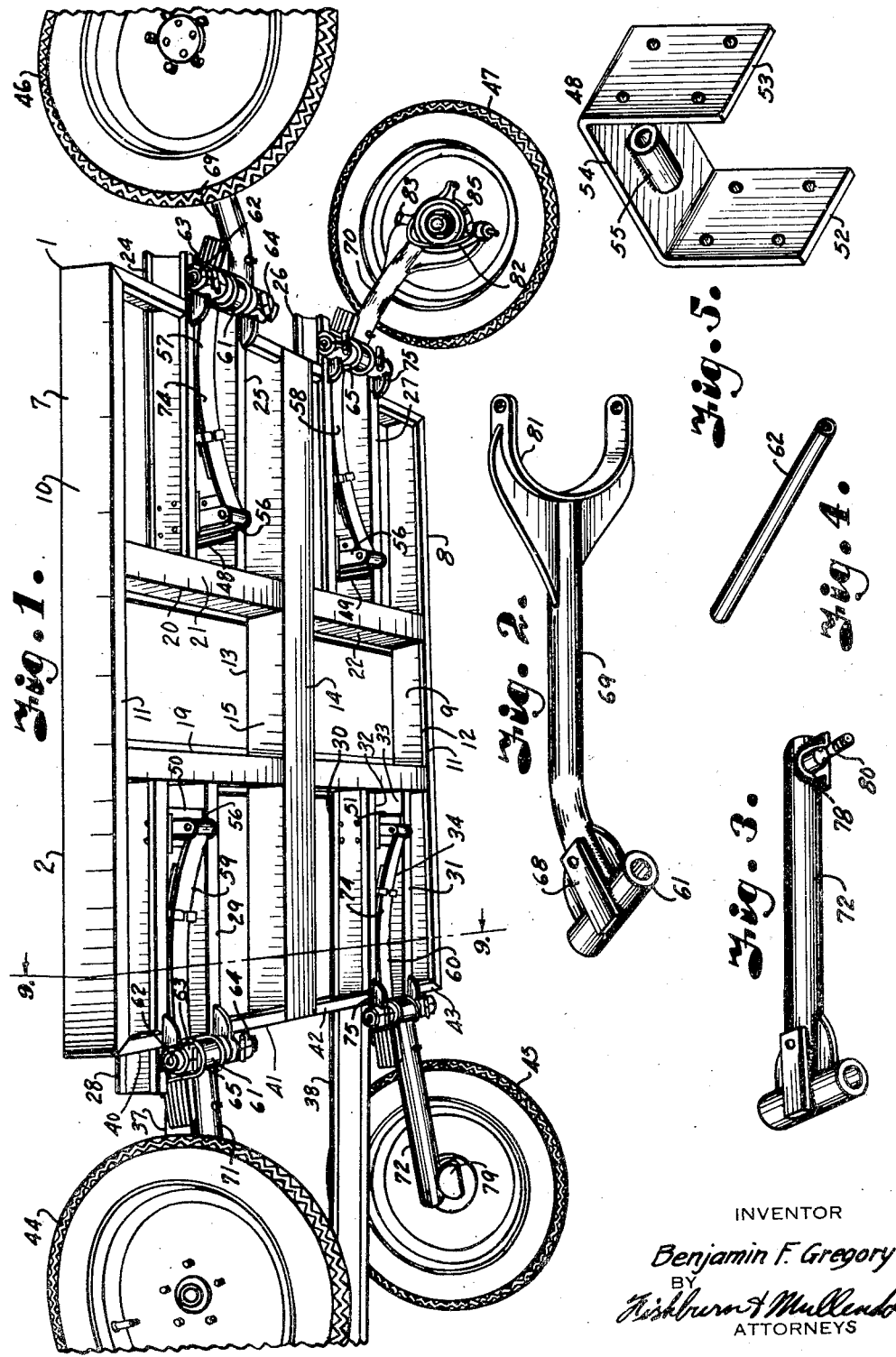
INVENTOR
*Benjamin F. Gregory*
BY
*Fishburn & Mullendore*
ATTORNEYS March 7, 1950 B. F. GREGORY 2,499,495
VEHICLE CHASSIS
Filed Dec. 8, 1945 3 Sheets-Sheet 2
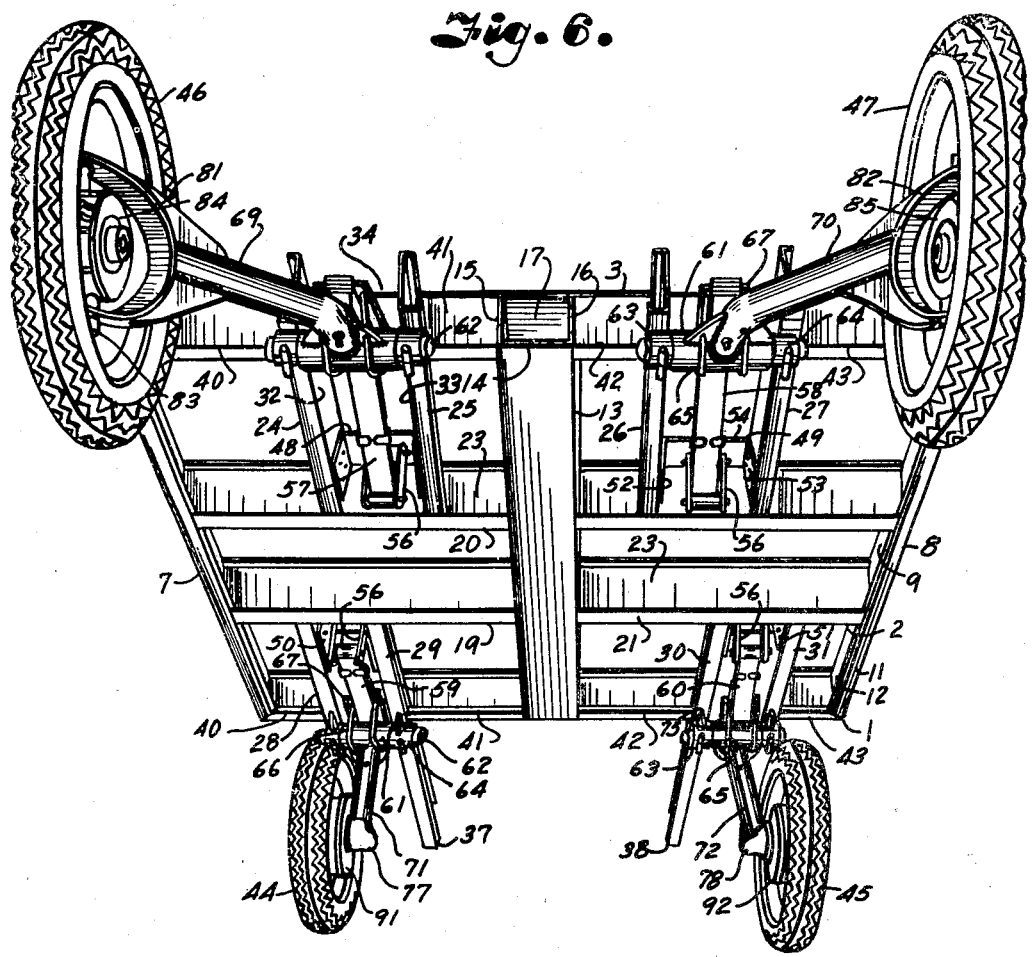
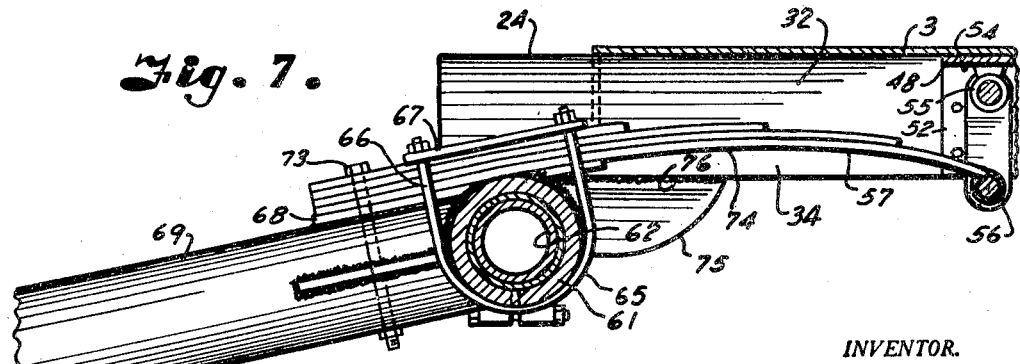
INVENTOR.
Benjamin F. Gregory
BY
Fishburn & Mullendore
ATTORNEYS

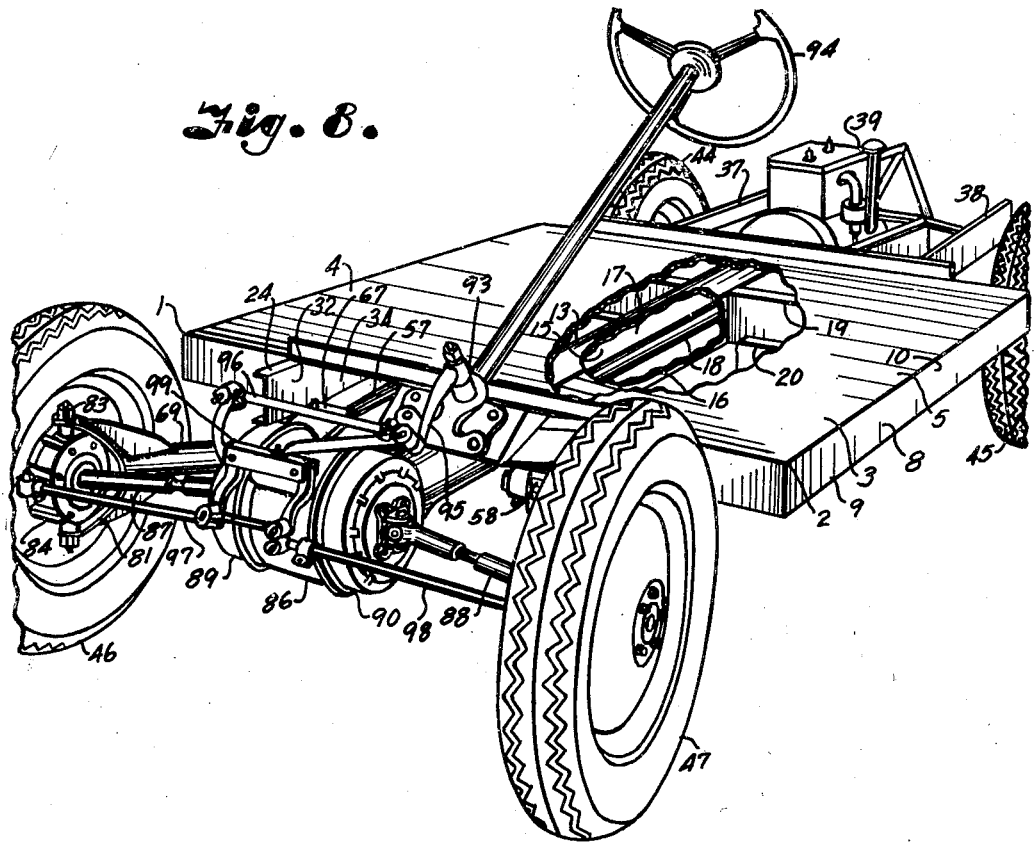
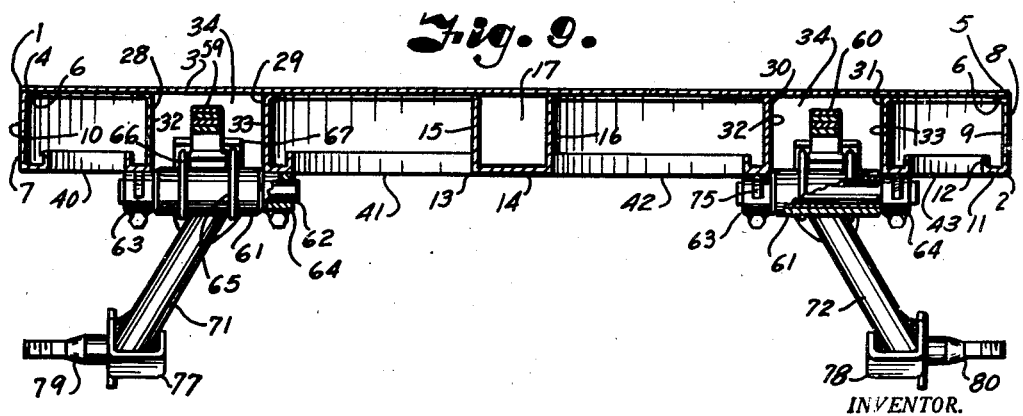

Patented Mar. 7, 1950

2,499,495

UNITED STATES PATENT OFFICE 2,499,495

VEHICLE CHASSIS

Benjamin F. Gregory, Kansas City, Mo., assignor, by mesne assignments, of one-half to Martha Realty Company, a corporation of Missouri Application December 8, 1945, Serial No. 633,767

5 Claims. (Cl. 280—106.5)

This invention relates to vehicles and more particularly to a vehicle chassis, the principal object being to provide a strong, light-weight structure equipped for individual wheel mounting to promote stability and easy riding qualities.

Other objects of the invention are to provide a low cost, readily fabricated unit upon which body and engine units are adapted to be detachably mounted; to provide a chassis frame which includes a platform-like portion that forms the floor of a vehicle body; to provide a chassis frame that is of box-like construction and having spring pockets formed between longitudinal members of the frame; to provide a frame with box-like transverse and longitudinal members for resisting transverse and torsional stresses; to provide the chassis with cantilever type springs arranged for resiliency of action and having the inherent property of checking rebound so as to eliminate the necessity of shock absorbers and similar dampening devices; to provide a chassis structure which promotes simplicity in assembly and accessible to the working parts such as the power and transmission units; and to provide a chassis which permits ready attachment and removal of a unitary body.

In accomplishing these and other objects of the invention hereinafter pointed out, I have provided improved structure, the preferred form of which is illustrated in the accompanying drawings wherein:

Fig. 1 is a perspective view of a vehicle chassis embodying the features of the present invention as viewed from the underside thereof.

Fig. 2 is a perspective view of one of the front wheel mounting arms.

Fig. 3 is a perspective view of one of the rear wheel mounting arms.

Fig. 4 is a perspective view of one of the tubular rock shaft supports for providing a pivotal mounting for the wheel supporting arms.

Fig. 5 is a perspective view of one of the spring shackle attaching brackets.

Fig. 6 is an underneath perspective view of the chassis as viewed from the front thereof.

Fig. 7 is an enlarged section particularly illustrating one of the wheel supporting arms and related spring assemblies.

Fig. 8 is a perspective view of the chassis as viewed from above, parts being broken away and shown in section to better illustrate the construction.

Fig. 9 is a cross section through the chassis on the line 9—9 of Fig. 1 and showing the wheels removed.

Referring more in detail to the drawings:

1 designates a vehicle chassis constructed in accordance with the present invention and which includes a frame 2 so constructed that it is adapted to be formed from one of the light-weight and relatively thin gauge metals. The frame incorporates a platform-like portion which includes a substantially rectangular horizontal sheet 3 of substantially rectangular form and having the sides 4 and 5 attached to horizontally inturned flanges 6 of substantially channel-shaped longitudinal members 7 and 8. The members 7 and 8 are also preferably formed of sheet material and include web portions 9 forming skirts 10 at the sides of the frame and which are adapted for attaching a body. To promote rigidity, the longitudinal members also have inturned lower flanges 11 with upturned lips 12 as best shown in Fig. 9. Also extending longitudinally of the frame below the floor sheet 3 and substantially midway of the side members 7 and 8 is a central longitudinal member 13 also formed of thin, light-weight material bent to form with the floor a substantially box-like shape having a bottom 14 and side flanges 15 and 16 of a size and spacing to accommodate a tunnel or passageway 17 through which a propeller shaft 18 extends.

Extending transversely of the frame and bridging the space between the side and central members are spaced girders 19 and 20 also of box-like formation and which have bottoms 21 and sides 22 and 23 that are attached to the platform sheet 3 along their upper edges. The ends of the members 19 and 20 are attached to the longitudinal members by welding or the like. Extending forwardly and rearwardly of the transverse girders 19 and 20 are pairs of secondary longitudinal members 24—25, 26—27 and 28—29, 30—31 preferably having the cross sectional shape of the side members to provide side walls 32 and 33 of longitudinal spring pockets 34.

The members 24—25 and 26—27 extend forwardly and beyond the side members to provide a mounting for the transmission and forward portion of the vehicle body (not shown) to be mounted on the chassis. The other members 28—29 and 30—31 extend rearwardly and the members 29 and 30 project beyond the side members of the frame as indicated at 37 and 38 to mount a motor unit 39 therebetween, the particular mounting of which forms no part of the invention. The forward and rear ends of the platform-like portion of the frame are closed intermediate the longitudinal members with the exception of the spring pockets by cross members 40, 41, 42 and 43 preferably having the same cross sectional shape as the side members and having the ends welded to the longitudinal members with the upper flanges suitably attached to the floor sheet by welding or the like.

It is obvious that a frame constructed and assembled as above described is of light-weight but rigid construction and provides for an enclosed mounting of the springs and the propeller shaft which connects the engine unit with the transmission.

The rear of the frame is carried on wheels 44 and 45 and the forward end of the frame is carried on similar wheels 46 and 47 but which are mounted to permit steering of the vehicle. Fixed to the longitudinal members defining the pockets adjacent the box-like cross girders are brackets 48, 49, 50 and 51. The brackets are of substantially U-shape to form attaching plates 52 and 53 by which they are secured to the respective longitudinal members. The brackets also have transversely extending portions 54 that carry sleeve-like shackle bearings 55 adapted to connect spring shackles 56 for movably anchoring the ends of springs 57, 58, 59 and 60 respectively, which springs project from the open ends of the pockets and are attached to rock sleeves 61 oscillatively mounted on transverse shafts 62 extending across the open lower portion of the pockets and carried at the ends by clamp brackets 63 and 64 attached to the underside of the longitudinal members which form the sides of the bracket as best shown in Figs. 6 and 9. The springs are preferably composed of a plurality of flat leaves having differential lengths and are arched between the spring shackles and the sleeve-like rock shafts in the direction of the frame as shown in Fig. 7 to provide substantial yieldability under the load carried by the frame and supported on the wheels. The U-bolts 65 extend around the underside of the sleeve-like rock shafts and have legs 66 extending upwardly alongside of the springs to carry plates 67 for clamping the springs to spring seats 68 on wheel mounting arms now to be described.

Fixed to each sleeve-like rock shaft are arms 69, 70, 71 and 72, the arms 69 and 70 extending forwardly of the pockets to carry the front wheels and arms 71 and 72 extend rearwardly to carry the rear wheels. The springs and spring seats are preferably of a length to overlap a portion of the arms so that they may be secured thereto by a fastening device such as bolts 73 projectable through openings in the spring leaves and through registering openings in the arms as best shown in Fig. 7. The stacked end of the springs are thus firmly anchored to the arms at the pivotal axis thereof so that movement of the arms on the shafts flex the arched portions 74 of the springs between the shackles and spring seats and the springs act to provide a resilient support on the wheels of the chassis frame and reduce rebound. The shackles anchor the ends of the springs and allow for effective change in length of the arch portions 74 of the springs incidental to rocking of the arms on the shafts 62.

The brackets anchoring the ends of the shafts carry lateral arms 75 that extend inwardly along the underside of the longitudinal members and are secured thereto by welding 76 or the like as indicated in Fig. 7. The outer ends of the rear arms 71 and 72 terminate in heads 77 and 78 that carry laterally extending spindles 79 and 80 on which the wheels are journalled. The forward ends of the front arms 69 and 70 carry yoke-shaped heads 81 and 82 for journalling the king pins 83 of wheel bearing housings 84 and 85 in which driving connections for the respective front wheels are mounted in accordance with my application for patent on Front wheel drive for motor vehicles, Serial No. 635,328, filed December 15, 1945.

The transmission is connected with a differential gear housing 86 from which drive shafts 87 and 88 extend to the respective front wheels. Operably connected with the respective drive shafts are brakes generally indicated at 89 and 90. The rear wheels are provided with ordinary brakes indicated at 91 and 92.

The front wheels are steered by a mechanism generally indicated by the numeral 93 and includes a steering wheel 94 for operating a crank arm 95 which is connected by a link 96 with drag links 97 and 98 through a stabilizer 99, the drag links being pivotally connected with the bearing housings of the respective wheels.

When the chassis is in use, the respective wheels are free to move to independently follow any irregularities in a road so that the frame may ride substantially level with a minimum of movement, the movement of the individual mounting arms being taken up by the springs. Consequently, the frame is characterized by its easy riding qualities.

Attention is directed to the fact that the wheel mounting arms are directly connected with the frame by means of the rock shafts, but these connections permit free fulcruming of the arms in the manner of levers but the moving force is under control and dampened by the springs.

Attention is also directed to the fact that the wheel ends of the lever arms are adapted to move a material distance so as to accommodate the wheels to substantially any road irregularities with a relatively little frame movement. This is because the mounting arms are pivoted on the frame at their inner ends and the springs are connected close to the pivots so that they have a comparatively small movement in absorbing the action of the wheels. The springs therefor act as snubbers or dampers and eliminate such extra equipment.

From the foregoing it is obvious that I have provided a vehicle chassis that is of strong, light-weight structure that has substantially road stability and easy riding qualities. It is also obvious that the chassis is of simple construction and easily assembled so that it may be manufactured at low cost.

What I claim and desire to secure by Letters Patent is:

1. A vehicle chassis including a frame having a platform-like portion, a tubular longitudinal member extending longitudinally of said platform-like portion adapted for accommodating a propeller shaft, longitudinal members laterally spaced from respective sides of the tubular longitudinal member and having ends projecting forwardly and rearwardly of the platform-like portion adapted for mounting a driving mechanism and a power unit to be connected by said propeller shaft, wheel mounting arms extending forwardly of the platform-like portion alongside of the last-named longitudinal members, wheel mounting arms extending rearwardly of the platform-like portion, means pivotally connecting the wheel mounting arms with said frame, springs fixed to said arms and extending from the pivotal connections, shackles connecting free ends of said springs with said frame, and wheels carried by said wheel mounting arms.

2. A vehicle chassis including a frame having a platform-like portion, a tubular member extending longitudinally of the platform portion, cross girders extending laterally from the tubular member, means cooperating with the cross girders for forming spring pockets in said platform-like portion, leaf springs having ends shackled in said pockets, wheel mounting arms fixed to said springs, and means pivotally connecting the wheel mounting arms with the platform-like portion and extending across said pockets.

3. A vehicle chassis including a frame, wheel mounting arms extending forwardly of the frame, similar arms extending rearwardly of the frame, means pivotally connecting the wheel mounting arms with the frame for independent oscillation on fixed axes, leaf springs fixed to the arms on the arm sides on the pivotal axes and extending across the pivotal axes in the general opposite direction to said arms, said springs being arched in the direction of the load being carried on the frame, shackles having fixed pivotal connection with the frame and with the upper ends of the springs, and wheels carried by said wheel mounting arms.

4. In a vehicle chassis including a frame, wheel mounting arms extending forwardly of the frame, similar arms extending rearwardly of the frame, a rock sleeve connected with each arm, shaft members extending transversely of the frame for oscillatably mounting the rock sleeves, spring seats on the arms and extending across the rock sleeves, arch-shaped leaf spring assemblies on the respective spring seats, means clamping one end of the leaf spring assemblies to the spring seat on the arm side of said rock sleeves with a concave side of said arch facing said spring seats and curving over the rock sleeves with the convex side uppermost, shackles connecting the other ends of the leaf spring assemblies with the frame whereby load carried on the frame tends to straighten said arch shape of the spring assemblies, and wheels carried by the wheel mounting arms.

5. In a vehicle chassis, a frame, a rock shaft, supports connecting ends of the rock shaft with the frame, a sleeve member oscillatably mounted on the rock shaft, a wheel mounting arm rigidly connected with the sleeve and projecting therefrom, an arch-shaped leaf spring assembly having one end fixed to said wheel mounting arm on the arm side of said sleeve and curving across the sleeve in a general opposite direction with respect to the arm, and a shackle pivotally connecting the spring assembly with the frame.

BENJAMIN F. GREGORY.

REFERENCES CITED

The following references are of record in the file of this patent:

UNITED STATES PATENTS

| Number | Name | Date |
|---|---|---|
| 1,281,233 | Van Geert | Oct. 8, 1918 |
| 1,697,099 | Wright | Jan. 1, 1929 |
| 2,007,134 | Rosenberg | July 2, 1935 |
| 2,071,577 | Renwick et al. | Feb. 23, 1937 |
| 2,126,607 | Boehner | Aug. 9, 1938 |

FOREIGN PATENTS

| Number | Country | Date |
|---|---|---|
| 187,866 | Great Britain | Nov. 2, 1922 |
| 272,205 | Great Britain | May 30, 1927 |
| 377,268 | Great Britain | July 20, 1932 |
| 378,482 | Great Britain | Aug. 15, 1932 |
| 431,015 | Great Britain | June 28, 1935 |